(12) United States Patent
Salsman

(10) Patent No.: US 6,237,723 B1
(45) Date of Patent: May 29, 2001

(54) QUICK CHECK BRAKE INDICATOR

(76) Inventor: Tony W. Salsman, 1601 Morrison Dr., Garland, TX (US) 75040

( * ) Notice: Subject to any disclaimer, the term of this patent is extended or adjusted under 35 U.S.C. 154(b) by 0 days.

(21) Appl. No.: 09/388,603

(22) Filed: Sep. 2, 1999

(51) Int. Cl.[7] ............................................. F16D 66/00
(52) U.S. Cl. ................................................. 188/1.11 W
(58) Field of Search ...................... 188/1.11 W, 1.11 R; 116/208; 33/609, 610

(56) References Cited

U.S. PATENT DOCUMENTS

| | | | |
|---|---|---|---|
| 3,976,167 | 8/1976 | Hirai et al. | 188/1 A |
| 4,085,826 | 4/1978 | Ritsema et al. | 188/1 A |
| 4,279,214 * | 7/1981 | Thorn | 116/208 |
| 4,311,214 | 1/1982 | Haraikawa et al. | 188/1.11 |
| 4,757,300 * | 7/1988 | Sebalos | 340/52 B |
| 4,776,438 * | 10/1988 | Schandelmeier | 188/1.11 |
| 5,139,114 | 8/1992 | Rodriguez et al. | 188/1.11 |
| 5,140,932 * | 8/1992 | Goldfein et al. | 116/208 |
| 5,226,509 * | 7/1993 | Smith | 188/1.11 |
| 6,076,639 * | 6/2000 | Dahlen et al. | 188/1.11 R |

* cited by examiner

Primary Examiner—Robert J. Oberleitner
Assistant Examiner—Benjamin A. Pezzlo
(74) Attorney, Agent, or Firm—Patent & Trademark Services; Thomas Zack; Joseph H. McGlynn

(57) ABSTRACT

A visual brake wear indicator gauge for a vehicle's disc brake system. A mounting bracket is fixed to the existing brake's caliper with a hollow housing extending from the bracket. The visual gauge has an indicator bar with straight length and a right angled indicator foot on one end that contacts an inside disc pad. This indicator bar extends through and within the gauge housing and is normally biased by a housing spring to contact the brake's disc pad. Two different adjacent visual color coded segments on the bar indicate the contacted disc pad are properly operating, when both are color segments are displayed to one side of the housing, or that the system needs repair if only one color coded segment is so displayed. The gauge bar indicates wear to either the vehicle's disc pads or the associated rotor of the vehicle's braking system.

4 Claims, 5 Drawing Sheets

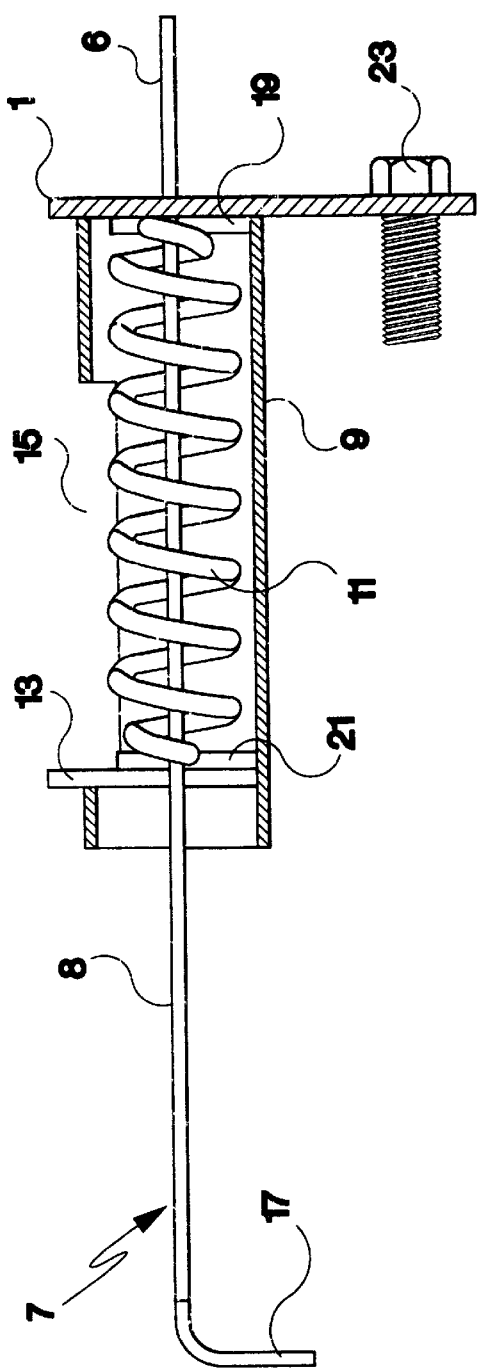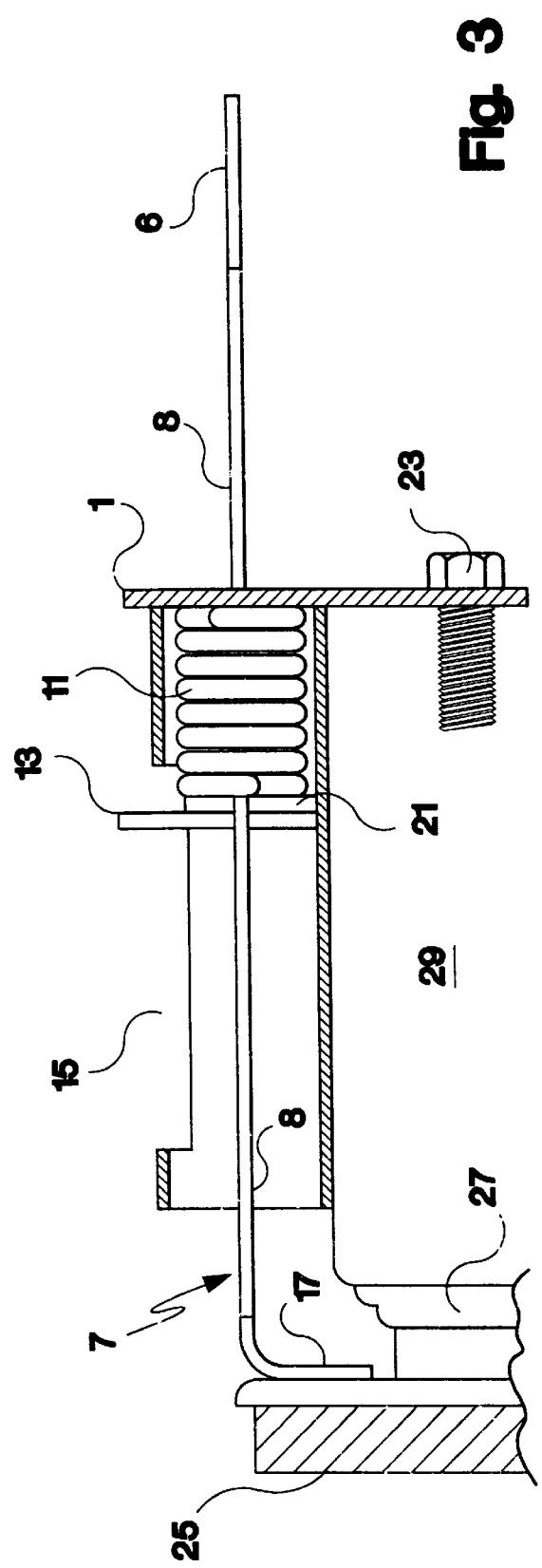

QUICK CHECK BRAKE INDICATOR

BACKGROUND OF THE INVENTION

This invention relates to gauge used with a disc pad and caliper piston checking to indicate excessive wear to a pad. It is employed without removing the tire and wheel assemblies of the vehicle. Particular application is found when the vehicle is subject to a lot of stop and go travel, such as that normally encountered by school buses and other street maintenance vehicles, where disc brake pads wear more due the heat and friction generated in this type of driving.

Wear indicators for disc brake systems or their pads are known. In one such invention an insertion hole for the indicator extends through a backing plate and into the pad for a distance equal to the length of the wear indicator. When the pad is worn away a sufficient amount the electrically conductive indicator is encountered by the disc and an alarm is generated. In another prior art invention, the brake wear indicator a prong and flange combination is used. When the prong engages a rotating disc or drum, the flange vibrates to generate an audible warning signal.

Still another invention discloses a disc brake with a stationary member secured to a non-rotatable part of a vehicle and a friction pad disposed on each side of the rotatable disc. A wear warning piece has one end secured to the stationary member and its other end extending between the disc and a backing plate of the friction pad by a predetermined distance. As wear occurs to the pads, the indicator is eventually contacted by the backing plate in applying the brakes resulting in a keen vibrational noise.

A more recent invention uses a visible wear indicator to indicate the remaining usable thickness of the brake block used in a drum brake system. The indicator is molded integrally in the brake block and has a safe surface indicated and a minimum safe point.

The present invention is a visual wear indicator for a disc brake system utilizing one caliper mounted gauge at each vehicle wheel all as will be described in detail hereafter.

DESCRIPTION OF THE PRIOR ART

Devices that alert a motor vehicle operator that the brakes are worn are known. For example, in the U.S. Pat. No. 3,976,167 to Hirai et al. an insertion hole for the indicator extends through a backing plate and into the pad for a distance equal to the length of the wear indicator. When the pad is worn away a sufficient amount, the electrically conductive indicator is encountered by the disc and an alarm is generated.

U.S. Pat. No. 4,085,826 to Ritsema et al. discloses a brake wear indicator having a prong and flange combination. When the prong engages a rotating disc or drum, the flange vibrates to generate an audible warning signal.

U.S. Pat. No. 4,311,214 to Haraikawa et al. discloses a disc brake wear indicator with a stationary member secured to a non-rotatable part of a vehicle and a friction pad disposed on each side of the rotatable disc. A wear warning piece has one end secured to the stationary member and its other end extending between the disc and a backing plate of the friction pad by a predetermined distance. As wear occurs to the pads, the indicator is eventually contacted by the backing plate in applying the brakes resulting in a keen vibrational noise.

U.S. Pat. No. 5,139,114 to Rodriguez et al. discloses a visible brake block indicator to indicate the remaining usable thickness of the brake block in a drum brake system. The indicator is is molded integrally in the brake block and has a safe surface indicated and a minimum safe point.

SUMMARY OF THE INVENTION

This invention relates to a gauge to visually indicate excessive pad wear in a vehicle disc brake system. The gauge has a hollow housing which housing is fixed to a mounting bracket. Extending through the housing is single bar. Along the length of the bar are two different color coded segments indicating either a contacted pad is operating in a safe range when both bar segments are visible or, if only the outer most second bar segment is visible and extending from one end of the housing, that excessive pad or rotor wear is detected. This second bar segment has a different second color coded segment from the first bar segment and when only it is displayed the user is informed that the brake pad contacted or associated rotor needs replacement.

It is three primary objects of the present invention to provide for an improved gauge to indicate wear on a vehicle's disc brakes, piston travel to piston seal leaks and rotor wear.

Another object is to provide for such an indicator wherein a color code warning indicator is displayed when excessive pad wear is detected.

These and other objects and advantages of the present invention will become apparent to readers from a consideration of the ensuing description and the accompanying drawings.

BRIEF DESCRIPTION OF THE DRAWINGS

FIG. 2 is a side cross sectional view of the present invention when only the second color bar segment is displayed.

FIG. 3 is a side cross sectional view of the present invention when both the first and second color bar segments are displayed and the apparatus is installed on a vehicle's braking system.

DESCRIPTION OF THE PREFERRED EMBODIMENT

Figure 1:
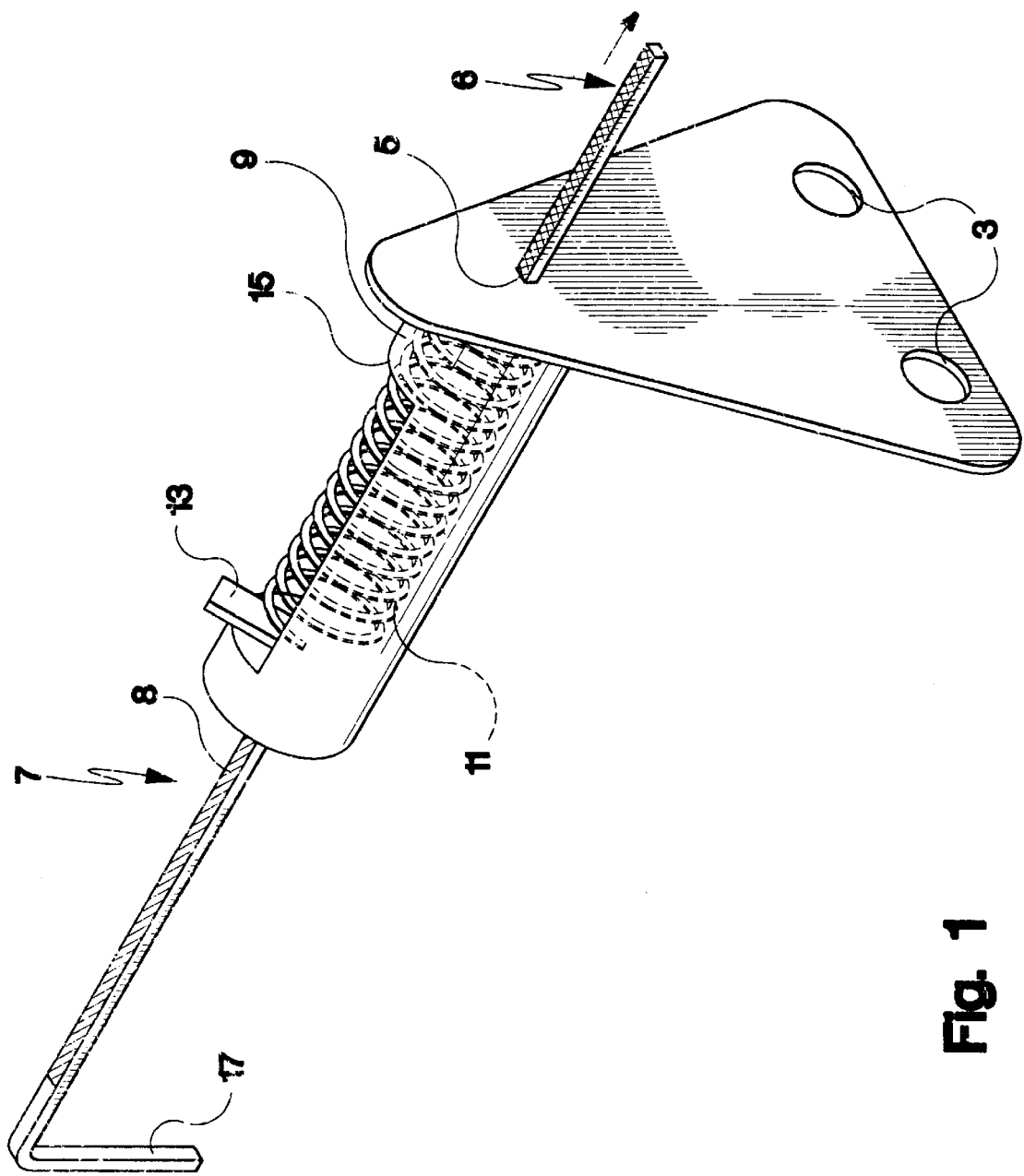
FIG. 1 is a perspective view of the present invention.

FIG. 1 is a perspective view of the present invention. The triangular shaped mounting plate 1 has two lower spaced bolt receiving spaced holes 3 and one upper rectangular shaped through apex hole 5. The two lower holes 3 are used along with bolts(not shown) to mount the invention to a conventional twin piston caliper. Reciprocally mounted in the hole 5 is a slidable rectangular in cross section shaped flat bar 7. The bar 7 is generally straight with two different color coded bar segments along the bar's length. One of these color coded segments 6 is partially shown to the right of the plate 1. A hollow housing 9 is fixed to the plate 1 at one end of the housing near the upper end of the plate. Within the confines of this hollow housing 9 another adjacent color coded bar segment 8 of the same bar 7 extends into and from the left side of the housing. This second bar segment 8 is partially within the housing and partially outside of the housing to extend from the housing's end opposite to bar segment 6.

Within the confines of the hollow housing 9 is a coil spring 11, shown in dotted line format, which is fixed to the plate 1 at one of its two ends. This spring encircles most of the bar 7 that is within the housing. The other end of the coil spring rests against the surface of an internal holed washer, not shown in this view, (see FIGS. 2–4) which washer bears against one side of a vertical stop pin 13, whose upper free end is visible. In turn the stop pin 13 has its movement along the length of and within the housing restricted by an upper housing slot 15 which extends along part of the length of the housing 9. The movement of the pin 13 is related to the movement of the bar 7. In the pin position illustrated in FIG. 1, the stop pin 13 is at its left most position and the bar 7 is extended to its left most position within the housing with the color segment 6 being the only visible bar segment color displayed. As will be more apparent when the other figures are discussed, the visual display of this single color coded bar segment 6 at shown indicates a warning condition to the braking system.

The left hand side free end of bar 7 has a right angle foot segment 17 which engages and bears against or contacts the inside surface of the inside disc pad (i.e., the pad surface side not engaged by the rotor). Thus, as the contacted pad wears, the bar 7 moves to the left until the stop pin 13 prevents its further movement in the same direction. In FIG. 1, the bar segment 8 is shown in its left most position which takes place when the stop pin 13 is also in its left most position within the slot opening 15. In this shown position the most measurable wear would be indicated on the engaged pad or the associated brake system rotor. Before, reaching this left most position the spring biased bar 7 and its carried pin 13 have moved relative to housing in unison to the left from the right. As this movement from right to left occurs more and more wear is indicated on the contact disc brake pads or their rotor.

FIG. 2 is a side cross sectional view of the present invention when only the second color bar segment 6 is displayed to the right of the plate 1 as in FIG. 1. In this view the near side of housing 9 is cut away on the housing's length to reveal its internal contents. The elongated coil spring 11 extends along and encircles most of the internal length of bar 7. At the right hand end the spring is fixed to the plate 1 by a weld 19. At the left hand end of the spring 11, the spring bears against a center holed vertically disposed washer 21 which is in turn fixed against the limiting movement vertical stop pin 13. Pin 13 rides on in a hole in the bar 7 with the pin's upper end portion extending through the top housing slot 15. This set up allows the bar 7 to reciprocate to the left as the free right end angled bar member 17 moves against a wearing break pad or rotor. Also shown in this view is one of the two aligned mounting bolts 23 insertable in one of the holes 3 shown in FIG. 1.

FIG. 3 is a side cross sectional view of the present invention similar to FIG. 2 except that in this view both the first and second color aligned bar segments are displayed to the right of the plate 1 and the apparatus is installed on a vehicle's braking system. When both bar adjacent segments 6 and 8 are partially or completely displayed to the right of the plate 1 at the same time, the contacted brake pad or rotor has not worn a sufficient amount to indicate any action is necessary at that time to replace them. In this view, the flat front rectangular shaped bar 7 has its right angled free end portion 17 forced by the coil spring 11 against the inside surface of the disc pad 25. As the pad wears the bar 7 and the spring will move and expand, respectively, and move to the left along with the bar 7 until part and then all of the safe operating range designated by the bar segment 8 is to the left of plate 1 and hidden from view. When the condition illustrated in FIGS. 1–2, occurs, action to replace the pads or rotor is necessary to insure the safe operation of the vehicle. Also schematically shown in this view, is the brake piston 27 and the brake caliper 29 on which plate 1 has been mounted by two bolts 23.

Figure 4:
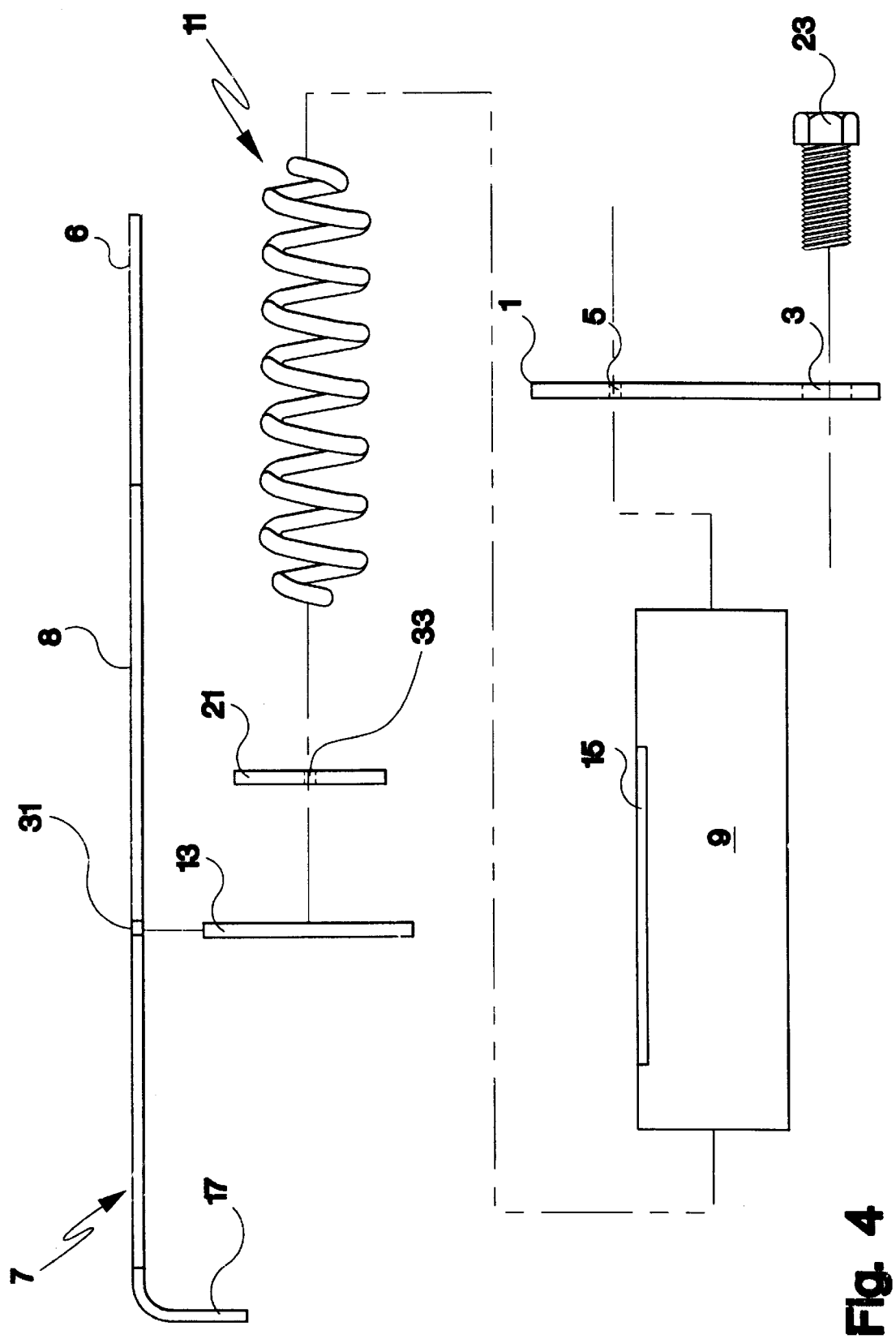
FIG. 4 is an exploded view of the individual components of the present invention shown in FIGS. 1–3.

FIG. 4 is an exploded view of the individual components of the gauge of the present invention shown in FIGS. 1–3. The bar 7 is generally straight with two different color coded segments 6 and 8 along its straight length portion. A pin receiving hole 31 extends vertically through the bar along its straight length portion. At one end of the bar is the warning color segment 6, like red, while most of the remaining straight bar segment 8 is colored, a different color, like white. The right angled bar segment 17 has no specific color. The cylindrically shaped stop pin 13 is sized and shaped to fit snugly within the bar hole 31 such that its upper portion is exposed from the housing. The circular shaped washer 21 which bears against the pin 13 has a center hole 33 in which the bar 7 fits. The conventional coil spring 11 has a flattened end 35 to bear against the abutting side surface of washer 21 and a similar flattened other end 37 that is welded by weld 19 (not show in this figure,see FIG. 2) to the plate 1. The hollow cylindrically shaped housing 9 has two opened ends and an upper slot 15 extending along and through its upper surface along most of the housing's length. The flattened solid triangular shaped mounting plate 1 has an upper bar receiving hole 5 that is shaped rectangular and two lower round aligned lower bolt receiving holes 3 as shown in FIG. 1.

Figure 5:
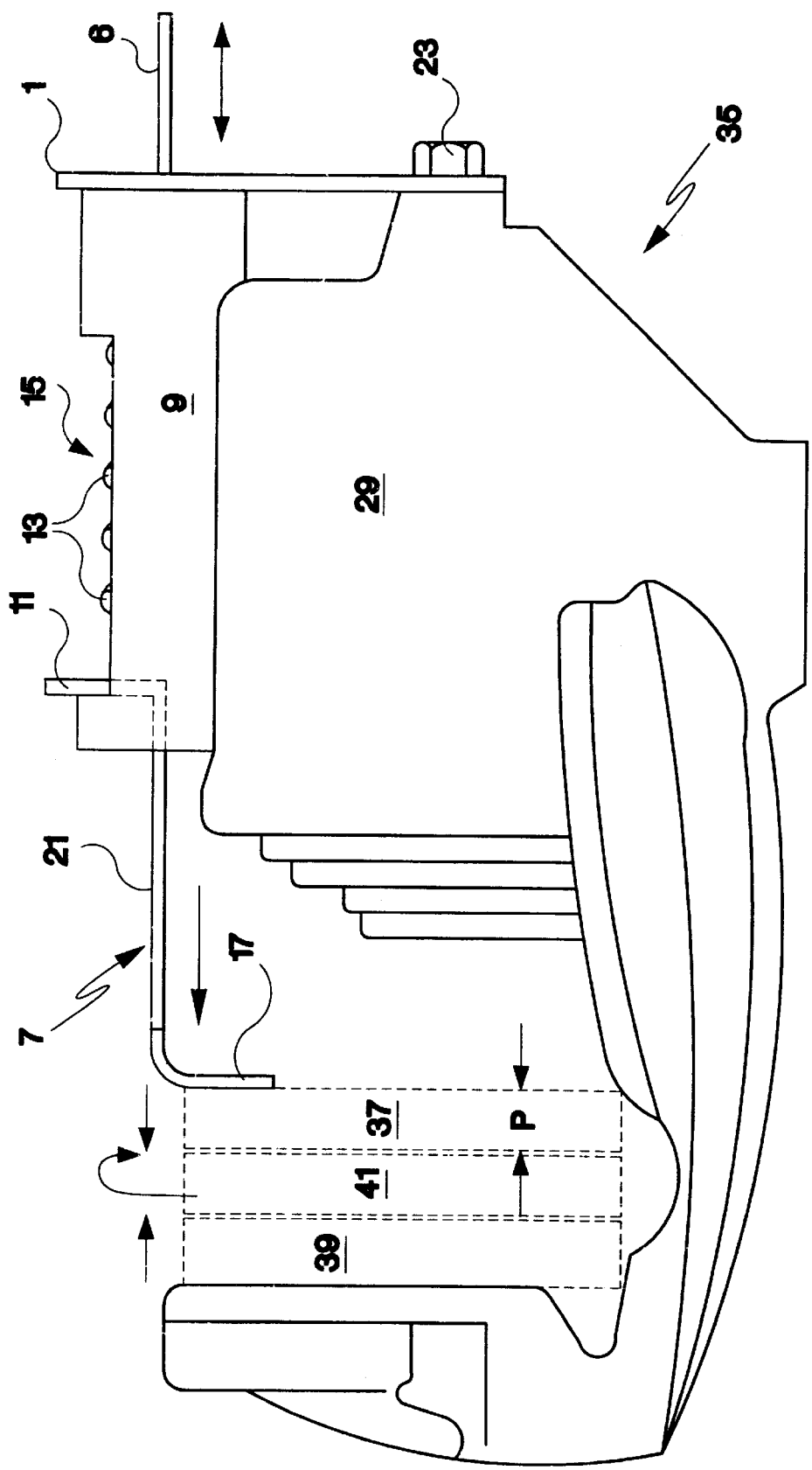
FIG. 5 is a side view of the FIG. 1 present invention shown mounted on a twin piston caliper

FIG. 5 is a side view of the FIG. 1 present invention shown mounted on a twin piston caliper. The twin piston caliper 35 is conventional in design. Essentially caliper 35 consists of two fluid actuated pistons that are used to force two disc pads 37 and 39 against the surface of a conventional rotor or rotatable disc 41 (the pads and disc are all shown here schematically in dotted line format). The coinpression of the two pads against the two opposite sides of the disc or rotor 41 results in frictional force being applied which, when sufficient, can stop the rotation movement of the rotor 41 and the vehicle's wheel which rotates in unison with the rotor The right angled free end portion 17 of bar 7 is forced by the spring 11 in housing 9 to constantly bear against outside or non rotor engaging surface the disc pad 37. As the thickness D of this pad or rotor decreases due to its frictional wearing away, the distance D would decrease and the spring biased bar 7 would move more and more to the left. This bar movement would cease when the stop pin 13 fixed to the bar 7 reaches the forward or left most end of the slot 15, as shown. When or slightly before this predetermined movement limit is reached for bar 7, only the bar's color segment 6 extends from the confines of the housing 9 and plate 1 to be visible.

In order to mount the FIG. 1 invention on the twin piston calipers, two mounting bolts are used in the plate holes 3. One of these two lower bolts 23 is shown extending into threaded bores holes in the side of the right caliper 29. Since, the two disc pads 37 and 39 generally are exposed to the same amount of frictional wear when they engage the sides of rotating disc 41 (or rotor), the wear on the outside pad 39 is approximately the same as that on the inside pad 37 and therefore no separate FIG. 1 gauge is need for the outside pad 39. Each vehicle wheel having a pair of disc pads would employ a separate mounted gauge as shown in FIG. 1.

Figure 6:
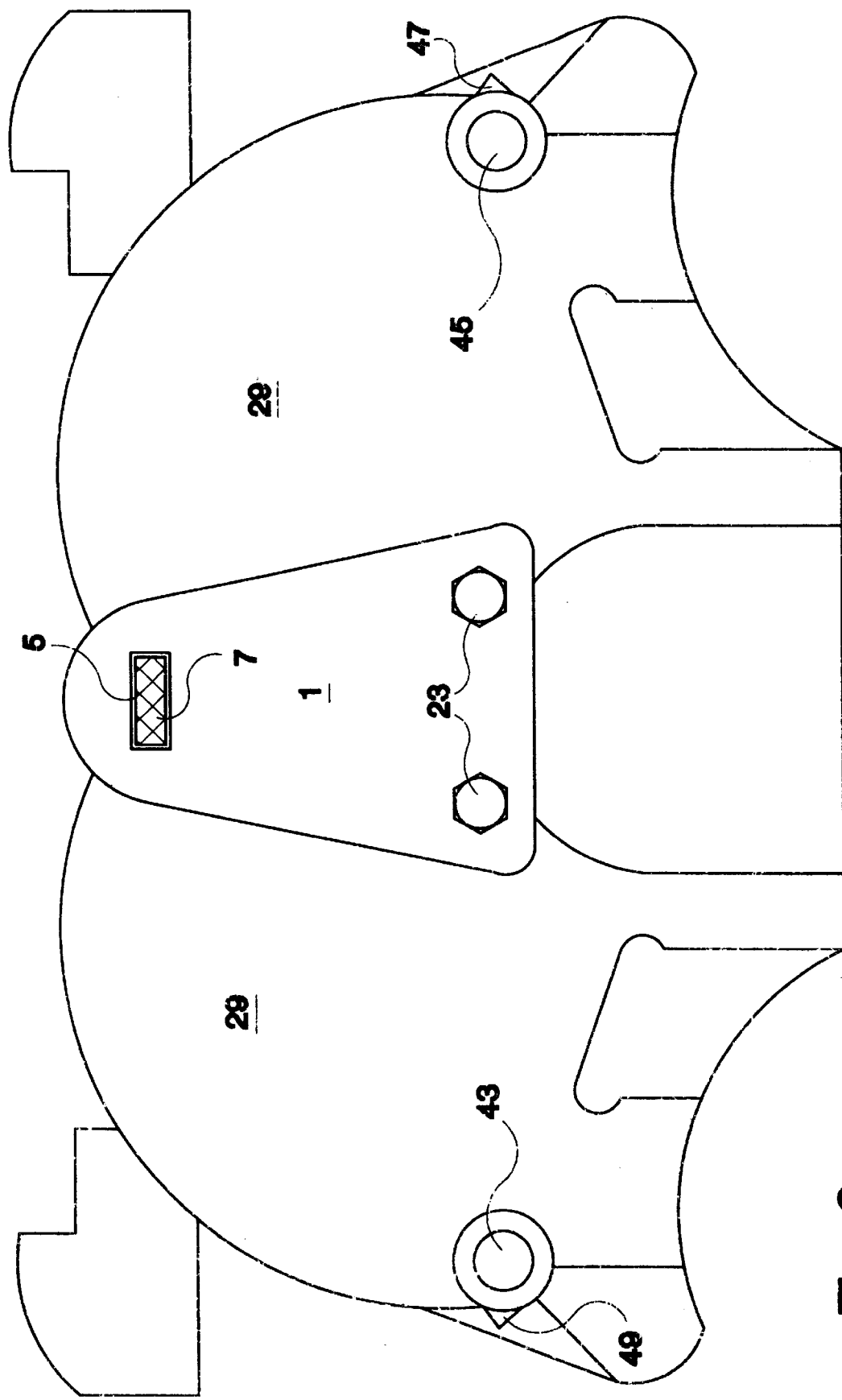
FIG. 6 is an end view of the FIG. 1 present invention shown mounted on a twin piston caliper.

FIG. 6 is an end view of the FIG. 1 present invention shown mounted on the same conventional twin piston caliper 29. In this view the other bracket mounting bolt 23 is shown extending into a threaded hole in the caliper 29. Also shown are the two conventional brake fluid feed line port openings 43 and 45 and their associated bleed vales 47 and 49. Hoses, not shown, supply pressured hydraulic brake fluid to and from the port openings to the closed interior of the twin calipers to move their pistons into engagement with the brake's disc 41. At the upper end of mounting plate 1 the rectangular exit through hole 5 for bar 7 is visible. This hole allows the bar 7 to move from the interior of housing 9 (behind plate 1 in this view) to extend outside the housing and to have its color coded segment 6 visible when excessive brake pad or rotor wear is detected.

The present invention not only detects excessive wear to brake pads but, as stated, can detect excessive disc brake rotor wear. If, new brake pads are installed but the rotor still needs replacement, this condition will also be detected and only the warning bar segment 6 displayed by itself. The real danger in either excessive pad or rotor wear is that the brake piston are extended to the point that they have travel as far as they can safely travel. Beyond this point, there is the imminent risk of brake fluid leaking out of the piston, and or the piston seal suffering a blowout. In either case, the result can be a complete failure of the vehicle's brake system.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A gauge on a vehicle braking system for measuring disc pad wear comprising:

a movable bar having a first end and second end, said bar being movable with the disc pad and rotor on the wheel of a vehicle's braking system;

a disc pad for a vehicle braking system;

said bar having a substantially right angle segment adjacent the second end of the bar which engages said disc pad;

said bar having two different color coded sections between the first end of the bar and the second end, a hollow housing having a first end and a second end, said housing mounting said bar partially within the hollow confines of the housing such that the first end of the bar can extend from the first end of the housing;

said housing having an opened slot, said bar having an extending stop member fixedly mounted to the bar, said stop member being within the housing and extending through said housing opened slot to limit the movement of the bar within the housing;

biasing means within said hollow housing for forcing said right angled segment of the bar into contact with the disc pad of the braking system; and a mounting bracket for mounting said housing and bar to the caliper of a vehicle's braking system, said bracket having an opening through which the first end of the bar can be extended when mounted within said housing, said bar first end when extending through said bracket displaying said two different color coded sections when the braking system is in an acceptable condition and only one of said two color coded sections when excessive wear is detected.

2. The gauge as claimed in claim 1, wherein said bar has a straight length with a free end, said two color coded segments being adjacent to each other along the straight length of said bar, one of the color coded segments extending to near the straight free end of the bar to visually indicating the wear on the engaged braking system is excessive when only this segment is displayed from the mounting bracket opening.

3. The gauge as claimed in claim 2, wherein biasing means is a coil spring member having two ends within the hollow housing.

4. The gauge as claimed in claim 1, wherein said bar has a hole adapted to receive said stop member, said stop member being a pin sized and shaped to fit snugly with said bar hole.

* * * * *